United States Patent
Conseil

(10) Patent No.: US 10,486,267 B2
(45) Date of Patent: Nov. 26, 2019

(54) LASER ABLATION METHOD WITH PATCH OPTIMIZATION

(71) Applicant: Agie Charmilles New Technologies SA, Geneva (CH)

(72) Inventor: David Conseil, Collonges-sous-Saleve (FR)

(73) Assignee: Agie Charmilles New Technologies SA, Geneva (CH)

( * ) Notice: Subject to any disclaimer, the term of this patent is extended or adjusted under 35 U.S.C. 154(b) by 0 days.

(21) Appl. No.: 14/995,535

(22) Filed: Jan. 14, 2016

(65) Prior Publication Data
US 2016/0207141 A1     Jul. 21, 2016

(30) Foreign Application Priority Data

Jan. 21, 2015   (EP) .................................... 15151873

(51) Int. Cl.
*B23K 26/00*     (2014.01)
*B23K 26/352*    (2014.01)
(Continued)

(52) U.S. Cl.
CPC ........ *B23K 26/355* (2018.08); *B23K 26/0006* (2013.01); *B23K 26/082* (2015.10);
(Continued)

(58) Field of Classification Search
CPC .............. B23K 26/0643; B23K 26/062; B23K 26/0084; B23K 26/362; B23K 26/359
USPC .............. 219/121.6, 121.61, 121.67, 121.68, 219/121.69, 121.71, 121.72, 121.73, 219/121.74, 121.75, 121.78, 121.79
See application file for complete search history.

(56) References Cited

U.S. PATENT DOCUMENTS

| | | | | |
|---|---|---|---|---|
| 3,832,948 A | * | 9/1974 | Barker | B23K 26/18 101/401.1 |
| 4,046,986 A | * | 9/1977 | Barker | B23K 26/18 219/121.6 |

(Continued)

FOREIGN PATENT DOCUMENTS

| | | |
|---|---|---|
| DE | 4209933 A1 | 9/1993 |
| EP | 1174208 A2 | 1/2002 |

(Continued)

OTHER PUBLICATIONS

European Search Report for EP Patent Application No. 15151873.5, dated Jul. 16, 2015.

*Primary Examiner* — Jimmy Chou
(74) *Attorney, Agent, or Firm* — Bachman & LaPointe, P.C.

(57) ABSTRACT

A laser ablation method is provided for the engraving of a surface (7) of a two or three dimensional workpiece with a texture (16) by the laser beam (2) of a laser machining head (1). The surface engraving is conducted in one or more layers (17.1, 17.2), which are machined consecutively, wherein each defined layer (17.1, 17.2) to be machined is subdivided into one or more patches (11) intended be machined one after another with the laser beam (2). The borderline (18) of at least one patch (19) is determined in such a manner to follow along a path on the layer (17.1, 17.2, 17.x) which will not be affected by the laser beam (2) engraving of the laser machining head (1).

15 Claims, 8 Drawing Sheets

(51) Int. Cl.
*B23K 26/362* (2014.01)
*B23K 26/359* (2014.01)
*B23K 26/40* (2014.01)
*G05B 19/4099* (2006.01)
*B23K 26/082* (2014.01)
*B23K 26/361* (2014.01)
*B44C 1/22* (2006.01)
*B23K 101/20* (2006.01)
*B23K 103/00* (2006.01)

(52) U.S. Cl.
CPC .......... *B23K 26/359* (2015.10); *B23K 26/361* (2015.10); *B23K 26/362* (2013.01); *B23K 26/40* (2013.01); *G05B 19/4099* (2013.01); *B23K 2101/20* (2018.08); *B23K 2103/50* (2018.08); *B44C 1/228* (2013.01); *G05B 2219/36199* (2013.01); *G05B 2219/45163* (2013.01)

(56) References Cited

U.S. PATENT DOCUMENTS

| | | | |
|---|---|---|---|
| 4,834,834 A * | 5/1989 | Ehrlich | C23F 4/00 118/50.1 |
| 5,024,724 A * | 6/1991 | Hirono | C23F 4/02 216/13 |
| 5,327,167 A * | 7/1994 | Pollard | B41C 1/05 219/121.68 |
| 5,389,196 A * | 2/1995 | Bloomstein | B29C 67/0051 216/66 |
| 5,478,426 A * | 12/1995 | Wiler | B41M 5/24 152/523 |
| 5,554,335 A * | 9/1996 | Fields | B23K 26/16 219/121.66 |
| 5,609,778 A * | 3/1997 | Pulaski | B41M 1/26 219/121.69 |
| 5,880,430 A * | 3/1999 | Wein | G06K 1/126 219/121.69 |
| 6,169,266 B1 * | 1/2001 | Hughes | B41M 5/24 219/121.68 |
| 6,503,310 B1 * | 1/2003 | Sullivan | B41M 5/262 106/31.6 |
| 6,518,544 B2 | 2/2003 | Aberle et al. | |
| 6,617,541 B1 * | 9/2003 | Wadman | B23K 26/18 219/121.69 |
| 6,720,524 B1 | 4/2004 | Hamada | |
| 6,822,192 B1 * | 11/2004 | Young | B28D 1/221 219/121.69 |
| 6,857,365 B2 * | 2/2005 | Juffinger | B41C 1/05 101/401.1 |
| 7,655,152 B2 * | 2/2010 | Nelson | B23K 26/0661 216/62 |
| 8,253,065 B2 * | 8/2012 | Zhang | B23K 26/06 219/121.68 |
| 8,502,107 B2 * | 8/2013 | Uckelmann | A61C 13/0004 156/272.2 |
| 8,524,139 B2 * | 9/2013 | Toth | B23K 26/12 219/121.6 |
| 8,603,590 B2 * | 12/2013 | Laude | C23C 18/1608 216/94 |
| 8,900,803 B2 * | 12/2014 | Alston | C04B 41/0036 264/446 |
| 2002/0017116 A1 * | 2/2002 | Koyama | B23K 26/032 65/392 |
| 2002/0043522 A1 * | 4/2002 | Aberle | B23K 26/08 219/121.78 |
| 2004/0232108 A1 * | 11/2004 | Giori | B41C 1/04 216/54 |
| 2005/0067390 A1 * | 3/2005 | Cromer | B41M 5/24 219/121.69 |
| 2006/0278613 A1 * | 12/2006 | Hess | B23K 26/0084 216/83 |
| 2007/0120842 A1 * | 5/2007 | Hess | B23K 26/364 345/419 |
| 2009/0008926 A1 * | 1/2009 | Depta | B42D 25/41 283/94 |
| 2010/0108651 A1 * | 5/2010 | Stahr | C03C 23/0025 219/121.69 |
| 2010/0140238 A1 * | 6/2010 | Mozley | F16K 17/16 219/121.72 |
| 2010/0197116 A1 * | 8/2010 | Shah | B23K 26/38 438/463 |
| 2010/0263323 A1 * | 10/2010 | Trinidade | B44C 1/26 52/747.11 |
| 2011/0024400 A1 * | 2/2011 | Rumsby | B23K 26/0732 219/121.61 |
| 2011/0068509 A1 * | 3/2011 | Perrier | B41C 1/05 264/400 |
| 2011/0100967 A1 * | 5/2011 | Yoo | B23K 26/032 219/121.73 |
| 2011/0127244 A1 * | 6/2011 | Li | C03B 33/091 219/121.69 |
| 2011/0129958 A1 * | 6/2011 | Rekow | B23K 26/03 438/95 |
| 2011/0180521 A1 * | 7/2011 | Quitter | B23K 26/03 219/121.73 |
| 2011/0240617 A1 * | 10/2011 | Xu | B23K 26/00 219/121.72 |
| 2011/0278268 A1 * | 11/2011 | Siman-Tov | B41C 1/02 219/121.69 |
| 2012/0205356 A1 * | 8/2012 | Pluss | B23K 26/0853 219/121.72 |
| 2012/0318776 A1 * | 12/2012 | Rekow | B23K 26/0861 219/121.69 |
| 2013/0270236 A1 * | 10/2013 | Burberry | B41C 1/05 219/121.68 |
| 2013/0344684 A1 * | 12/2013 | Bowden | H01L 21/2633 438/463 |
| 2014/0021177 A1 * | 1/2014 | Koch | B23K 26/36 219/121.69 |
| 2014/0154871 A1 * | 6/2014 | Hwang | B23K 26/38 438/463 |
| 2014/0175067 A1 * | 6/2014 | Reichenbach | B23K 26/0066 219/121.61 |
| 2014/0209581 A1 * | 7/2014 | Pawlowski | B23K 26/03 219/121.69 |
| 2014/0367369 A1 * | 12/2014 | Nashner | B23K 26/0081 219/121.66 |
| 2015/0049593 A1 * | 2/2015 | Oliveira | B44C 1/228 368/276 |
| 2015/0059599 A1 * | 3/2015 | Boegli | B31F 1/07 101/23 |
| 2016/0207141 A1 * | 7/2016 | Conseil | B23K 26/362 |

FOREIGN PATENT DOCUMENTS

| | | |
|---|---|---|
| EP | 2301706 A2 | 3/2011 |
| EP | 2647464 A1 | 10/2013 |
| JP | 2011140057 A | 7/2011 |
| WO | 00/74891 A1 | 12/2000 |
| WO | 2005/030430 A1 | 4/2005 |

\* cited by examiner

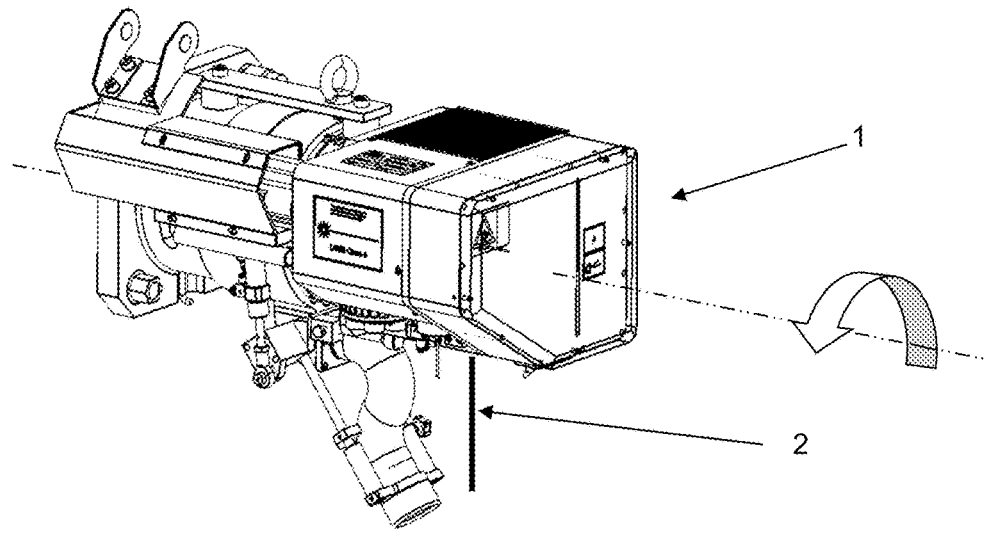
Figure 2            Prior Art
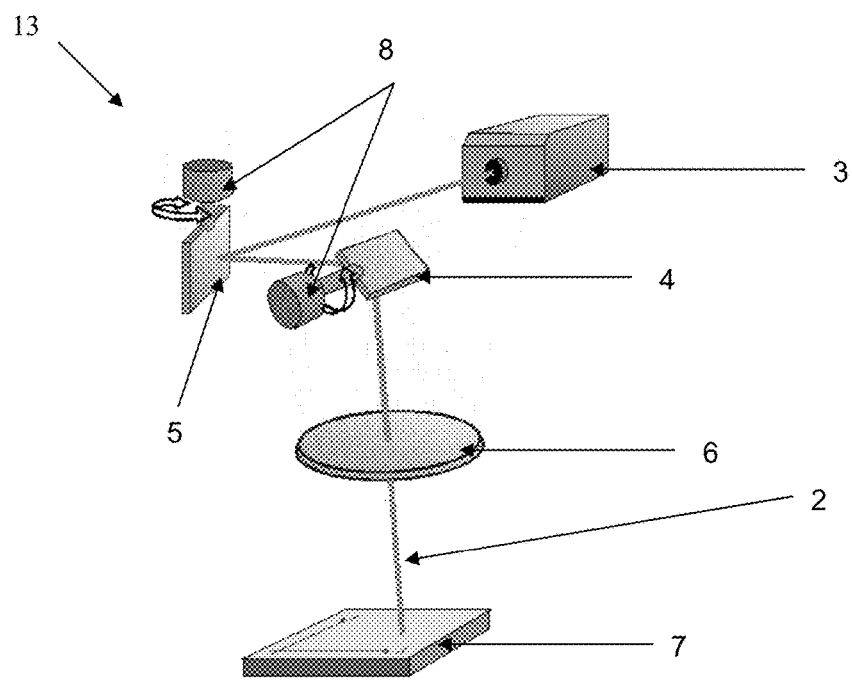
Figure 3            Prior Art

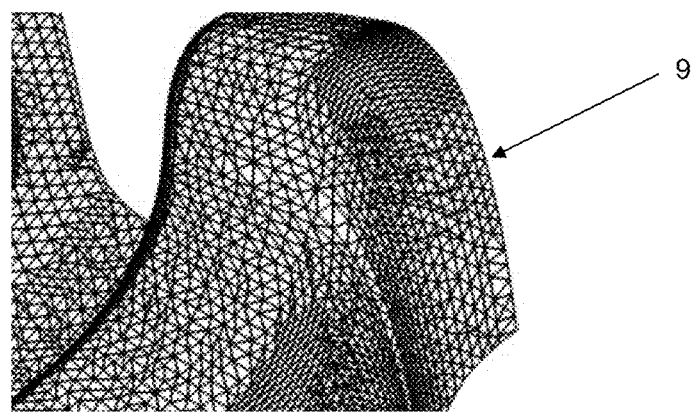
Figure 5  Prior Art
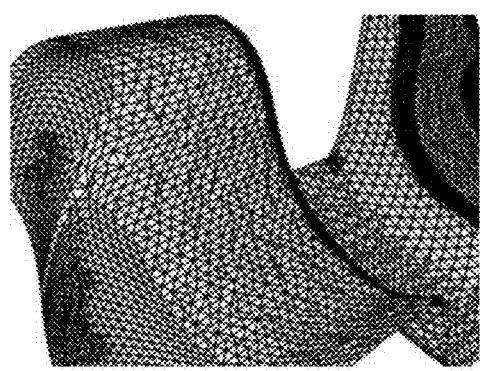 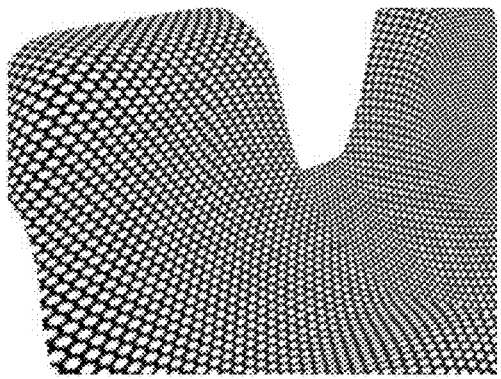
Figure 6a  Figure 6b
Prior Art  Prior Art

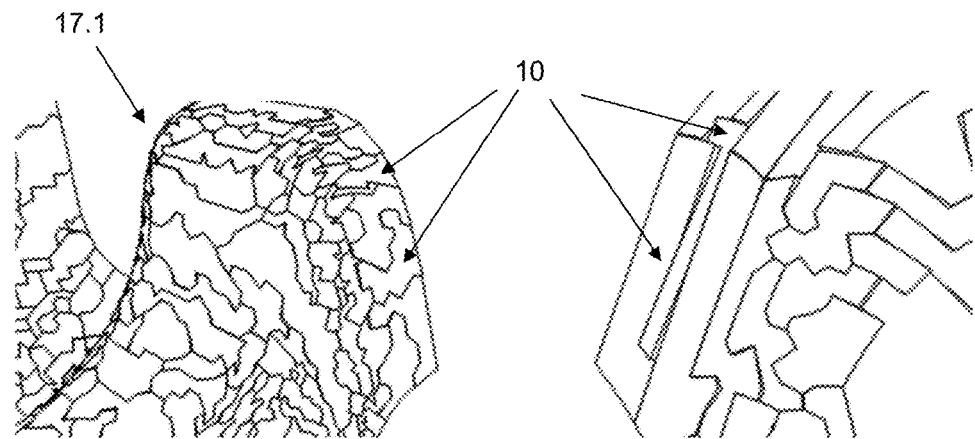
Figure 7a
Prior Art
Figure 7b
Prior Art
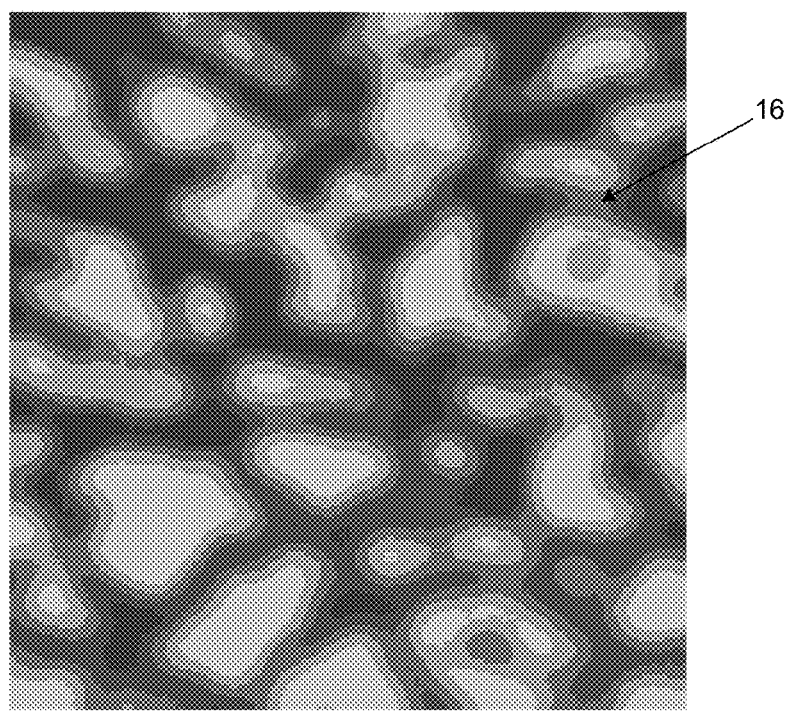
Figure 8

Grey level image (all coats) of the texture

LASER ABLATION METHOD WITH PATCH OPTIMIZATION

CROSS REFERENCE TO RELATED APPLICATION

Priority is claimed of EP patent application EP15151873.5, filed Jan. 21, 2015, and entitled "Laser ablation method with patch optimization", the disclosure of which is incorporated by reference in its entirety herein as if set forth at length.

BACKGROUND OF THE INVENTION

The present invention relates to a laser ablation method with patch optimization.

Machines for machining workpieces by laser ablation are generally known. European patent application EP 2 301 706 A2 describes for instance a possible technical design for such an apparatus.

An imaginable configuration and design for such a machine for machining workpieces by laser ablation is shown in FIG. 1. The laser head 1 of the displayed machine operates with 5 mechanical axes and allows the positioning of the laser focal point and the direction of the emitted laser beam on the surface of a three-dimensional solid workpieces situated within the machine (not shown). Several machine configurations are imaginable: For instance a workpiece-holder or—as shown in FIG. 1—a laser head which is linear movable in three axis (Cartesian X, Y, Z system). Preferably, allowing a higher accuracy and flexibility, the workpiece-holder or the laser head are in addition able to rotate with high precision on two rotational axes.

FIG. 2 illustrates a possible laser head for machining workpieces by laser ablation. The shown machine's laser head 1 comprises in particular actors allowing its rotational movement, a laser source, optics and a so called galvanometer module. The schematic configuration and functional principle of such a galvanometer 13 is illustrated in FIG. 3. The laser source 3 emits a laser beam 2 (actually laser beam pulses), which is deflected by an X-axis mirror 4 and a Y-axis mirror 5 and passes through an F-theta lens 6 or a lens with dynamic field correction till it reaches the workpiece 7. This allows moving the beam 2 on a plane with a surface corresponding to the selected focal length. Focal lengths of up to 430 mm are state of the art. For further details on the construction of such a machine for the laser ablation reference is made to the above-mentioned European patent application EP 2 301 706 A2.

For laser ablation applications explained further down, known systems allow on flat workpieces 7 to achieve a maximal, so called engraving or marking field for the laser beam of 300×300 mm for a 430 lens (see FIG. 3). On curved workpiece surfaces however, the laser engraving field would be limited with an optical system as displayed in FIG. 3 to the focalization capabilities of the lenses. The focalization capabilities of an optical system as displayed in FIG. 3 usually allow a shift of the (image) plane in the z-axis in the range of 0.3 mm depending of the focal lens used. That number defines the so called "working depth" for the laser engraving. If a surface to be worked is curved and the working depth of the laser is not sufficient to reach the deeper parts of that workpiece surface, the deeper parts need to worked in another process step by the creation of a new patch to be processed (requiring consequently a repositioning of the machining head). It would of course be possible to engrave three-dimensional shapes with such a—two-dimensional—galvanometer by the use of that very limited focalization depth in the z-axis being around 0.3 mm. However such a machining would take much more time due to an increased amount of necessary patches to texture a three-dimensional shape on the three-dimensional workpiece surface 7.

To overcome such a limitation on the working depth, it is on the other hand possible and known to include in optical systems a "zoom" for the z-axis (focus shifter), allowing therewith the shifting of the laser engraving field and the working depth even up to +/−80 mm such an optical system is displayed in the following FIG. 3a: The optical system includes a so called laser z focus shifter 12. The laser z focus shifter 12 allows the engraving of fields with depths even up to +/−80 mm in the z-axis. The workpiece surface 7 that is to say engraving field can consequently be three-dimensional (e.g. curved as displayed in FIG. 3a). By the use of a Z focus shifter, the repositioning of the laser head to another position for machining another patch is not avoided; nonetheless the amount of necessary patches 11 to machine a workpiece surface 7 is therewith substantially reduced and consequently the amount of laser head 1 repositionings—one repositioning for each machined patch—is also substantially reduced.

For the engraving that is to say texturing of a workpiece surface it is common—since necessary—to subdivide the workpiece surface into at least two—in practice many—so called plots or patches.

Laser ablation methods used for the engraving of the surface of a workpiece operate by sublimating the (usually metallic) material on the surface of the workpiece. The laser ablation machining occurs in a multiplicity of process steps in which the surface structure is worked layerwise. The working of a workpiece surface in layers is due to the simple fact, that a laser beam is just able to ablate a surface down to a limited thickness. In fact, the laser is able to take away 1 to 5 μm of material in one passage. The texturing that is to say engraving by laser ablation of a typical metallic workpiece requests usually a working in 20 to 100 passages (that is to say layers) on the surface of the workpiece. The principle used to produce the desired structure, or texture, on the surface of the 3D mould is described for instance in the document DE 42 09 933 A1. The process can be seen as "inverted stereolithography": instead of raising the coats for building, the material is sublimed coat by coat by the machining as described for instance as well in a further publication, the EP 1189724 A0 that is to say WO 0074891 A1. The layers are machined by the laser beam from the top of the 3D mould surface to the deepest part thereof.

FIG. 3b illustrates schematically the known and used way a laser beam ablates the surface that is to say the predefined patch 11 of a workpiece: The (not displayed) laser head emits laser pulses which are deflected at two or more mirrors of a galvanometer 8 and hit the workpiece surface in the patch 11 (as mentioned before, the workpiece surface is subdivided into a multitude of defined areas which are commonly called patches). Where the laser pulses hit the surface, material is evaporated. The laser beam 2 consisting of constantly emitted laser pulses is moved by the actors and mirrors of the galvanometer 8 in the commonly used vector-like manner on a predefined way, producing microscopic and parallel arranged corrugations on the workpiece surface delimited by the borders of the patch 11 (see parallel alignments in FIG. 3b). The corrugations are formed by sublimating material away from the surface. The depth in which the ablation of material occurs typically reaches a range of 1 to 5 μm. Although technically possible, the ablation of thicker layers is usually not indicated due to quality reasons. For deeper engraving it is preferred to ablate in more layers—20 to 100 layers to be processed in sequence—to reach the requested result. For processing the workpiece surface, the laser beam always moves along the predefined parallels vectors on the displayed patch 11 of FIG. 3b, jumping at the border of the patch 11 to the next position. To produce a texture that is to say a relief on the surface, the laser pulses are switched off whenever the sublimation of material is not requested. This is the known and commonly used method for the laser texturing that is to say engraving of a predefined patch on a workpiece (called vector-like working process). The method unfortunately produces visible borders at the margin of the patches, as can be seen on the picture of FIG. 3c: The borders of the triangular patches are clearly visible. The picture illustrates on the other hand also the traces of the commonly used ablation in vector-like manner well visible are the typical microscopic parallel arranged corrugations on the workpiece surface delimited by the borders of the patch 11 (see parallel alignments in FIG. 3c).

The visible borders illustrated for instance in FIG. 3c are obviously not desired. Different methods to reduce the visibility of generated patch borders are known and will be explained in the following.

To reduce the traces, the ablation process can for instance be conducted layerwise, working every defined patch of one layer before moving to the processing of the next layer. The patch borders of subsequent layers are then changed, avoiding therewith that they lie upon another and generate a multiplication of visible traces. The changing patch borders are illustrated in FIG. 4. The left and the right picture of FIG. 4 represent two subsequent layers 17.1 and 17.2. As illustrated, the defined patch-borders of the patches 11 on the subsequent layer 17.2 (picture on the right side) have a different form compared to the patches 11 on the preceding layer 17.1.

The machine control system dedicated for such a laser ablation process accurately positions the laser head—with its for instance 5 degrees of freedom movement abilities—whenever necessary conveniently near to the workpiece surface so that the patch can be optimally processed.

The computer files modeling the 3D surface of a solid workpiece to be worked are mesh files (see FIG. 5). The machine control system gets the 3d-coordinates of the workpiece surface in digital form and uses that information for the local partial engraving by the laser head.

The textures to be ablated are additionally applied that is to say processed by software to the mesh file of the modeled 3D-surface of the workpiece. The application of the surface texture by software and laser ablation has many advantages compared to the physical plating used in the past. The texturing, particularly. engraving, of a modeled 3D-surface by software is well known and particularly allows correcting visible distortions of the structure, which would inevitably occur with a traditional physical plating process on strongly contorted surface parts of a workpiece. The software is able to suitably distort or stretch the texture to be applied on those critical surface parts and allows herewith obtaining good results (FIG. 6b).

A known method for the 3D laser engraving of an image that is to say texture on the surface of a three dimensional workpiece by partially ablating a multiplicity of layers is described for instance in the already mentioned document WO 0074891 A1 (EP 1 189 724 A0).

The realization of a three dimensional texture on a surface of a workpiece requires as mentioned in most cases to work with many layers and to split the surface of every layer into several patches depending on the curvature of the workpiece, according the requested machining accuracy and in view of further machining field characteristics offered by the laser head and its optics (focal length, eventually by use of a focus shifter in z-axis). Usually the patches do not exceed the size of 175×175 mm.

An example of such a workpiece surface breakdown in several patches is displayed with FIGS. 7a and 7b (FIG. 5 represents herein the corresponding mesh file of the 3D surface of the workpiece). FIGS. 7a and 7b display actually one layer of the workpiece surface, which consists of many planar patches 10. The planar patches 10 of FIGS. 7a and 7b are virtually generated by the software, containing each the planar projection of the three dimensional texture to be applied on the real three dimensional workpiece surface. The projections on the planar patches 10 of the texture to be applied on the workpiece have to take account of the occurring optical distortion. The workpiece surface of a corresponding planar patch 10 is often not necessarily plane. Defining the planar patch 10, the software needs to consider this optically essential detail. More details about subdivision of the three dimensional texture into patches can be found in the document WO 2005/030430 A1.

The working depth permitted by the lenses (up to +/−80 mm) corresponds actually to the maximal distance allowed between a real point to be machined on the workpiece surface and its projection on the planar patch 10 (see FIG. 7b). If that distance exceeds the allowed working depth of the laser apparatus, a new planar patch 10 needs to be defined by the software and the processing of that new patch will actually also require a new alignment of the laser head 1.

For every—three dimensional—layer to be machined, the software will calculate and define new suitable planar patches according the given technical requirements. The software always considers of course the actual and real three dimensional shape of the workpiece surface (memorized as a mesh file in the memory of the processor) and the texture to be applied thereto.

The laser beam processes according to the state of the art layer by layer and within each layer patch surface by patch surface by repositioning the laser head. Ablating the workpiece in this way, results in ending with a machined workpiece containing the desired texture on its surface.

The texture to be applied that is to say engraved on a workpiece surface is typically defined as grey level image. FIG. 8 illustrates such a grey level image 16. The grey level image 16 representing a three-dimensional texture is composed by a multiplicity of individual dots, whereby the depth of a point is defined as a corresponding grey level of the corresponding dot. The lighter a dot, the less deep is the texture at that specific point. The darker the dot, the deeper is the texture at that specific position. Preferably the amount of grey levels corresponds to the amount of applied layers and every layer is represented by a specific grey level. By that, a grey level image defines for each layer if a specific point needs to be ablated or not during the machining of that layer: is a dot on the grey level image 16 equal or darker than the grey level of the specific processed layer, then the corresponding point needs to be ablated. Is a dot in the grey level image lighter than the grey level of that specific layer, then the corresponding point must not to be ablated (neither during the machining of that layer nor of any subsequent layer). A white dot or area represents consequently a point or area of the texture surface with no deepness (not shown in FIG. 8). This means, the texture corresponds at that position to the (unmachined) surface and no laser ablation has to occur there.

As mentioned before, the conventional way to ablate a workpiece by segmenting the surface into several portions leaves often traces at the borders of each patch. The corrugations generated by the laser beam movement in vector-like manner (see FIG. 3c) leave at their end at the boundaries of each patch per se a trace. The machining of adjoin patches—having the exact same patch boundary—worsen the situation by creating an additional overlapping effect. Either the pulses produce a doubled removal of material or—in case the boundaries of two adjoining patches do not perfectly coincide but are slightly spaced from each other—a reduced material removal occurs at the boundary. In any case, the result is an undesired, visible border line on the boundaries of each defined patch (see FIG. 3c).

A way to machine all patches of a workpiece reducing the formation of visible boundary lines is described in the document EP1 174 208. In that document, the formation of boundary lines is diminished by foreseeing certain overlapping areas between two adjoined patches. In the overlapping areas the removal of material is conducted by the machining of both overlapping patches. The chosen approach should result in the diffusion of the traces of the boundary lines generated by the laser beam moved in the vector-like manner.

Nonetheless, even the method disclosed in the EP1 174 208 does not always produce satisfying results. At the corner areas for instance, where four patches overlap (see for example FIG. 2 of EP1 174 208), the obtainable results are not always satisfying. Further, during the machining by patches, each patch may have a different optical rendering. This can be problematic since these reflections are visible on the machined material, but also in the case the workpiece represents a mould, on the molded workpiece. Another limitation is that the vectors of adjacent patches must be continuous (meaning each vector has to be straight and continue throughout the adjacent patches, that is to say being aligned with the other vectors) when this method is applied.

The process disclosed in the EP1 174 208—as every other known process up to date—works with the described vector-like ablation method as described for FIG. 3b. That's the usual and known way to texture that is to say. engraving a workpiece-surface by laser ablation.

The document EP 2 647 464 A1 discloses also a method to mitigate the formation of boundary lines between patches achieved by ablating the surface pointwise with randomly set machining dots instead of having parallel arranged corrugations produced with the ablation in vector-like manner.

For all known methods, the laser head needs to be repositioned for every patch to be machined.

SUMMARY OF THE INVENTION

The problem to reduce the traces of boundary lines on the textured surface is solved today with the possibilities offered by the above-mentioned state of the art. The machining of many subsequent layers is necessary to reduce those traces today and for each layer the laser head needs to be repositioned every time a new patch is going to be machined. The possibilities offered by the state of the art leave consequently still space for improvement: It can be said, the better the traces of boundary lines need to be reduced the more laborious and time consuming is the machining process today with the known solutions.

The object of this invention is consequently to provide for a new laser ablation machining method which avoids the formation of boundary line traces and reduces the necessary machining time for producing a textured workpiece surface.

The objective of the invention is achieved by providing a laser ablation method for the engraving of the surface of a two or three dimensional workpiece according to the features below.

BRIEF DESCRIPTION OF THE DRAWINGS

FIG. 2 is a view of a laser head of the machine;

FIG. 3 is a schematic view of a galvanometer of the laser head;

FIG. 5 is a view of a mesh modeling the 3D surface of a solid workpiece;

FIG. 6a is a view of an original mesh;

FIG. 6b is a view of the mesh of FIG. 6a after processing by software to suitably distort or stretch the texture to be applied on critical surface parts;

FIG. 7a is a view of a workpiece surface breakdown in several patches;

FIG. 7b is an enlarged view of a portion of the workpiece surface breakdown of FIG. 7a;

FIG. 8 is a view of a first grey level image defining the texture to be engraved on a workpiece surface;

FIG. 10a-10d respectively are illustrations of the first four defined layers which will be processed for applying the texture of the grey level image according to FIG. 9a;

DETAILED DESCRIPTION

Figure 1:
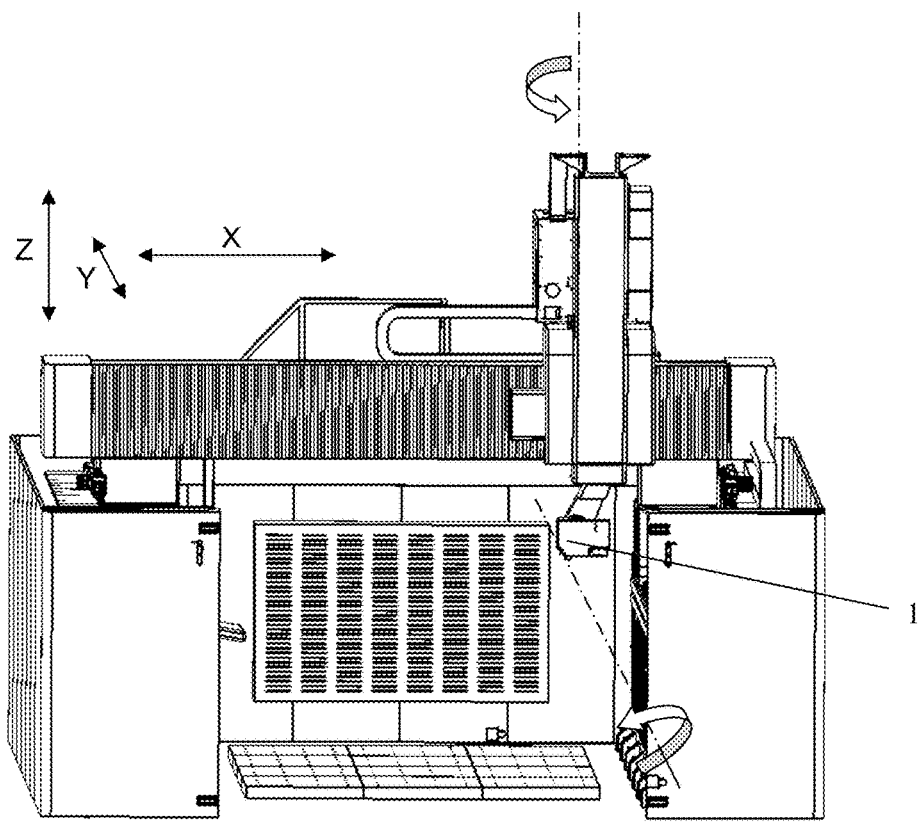
FIG. 1 is a view of a machine for machining workpieces by laser ablation.
Figure 3A:
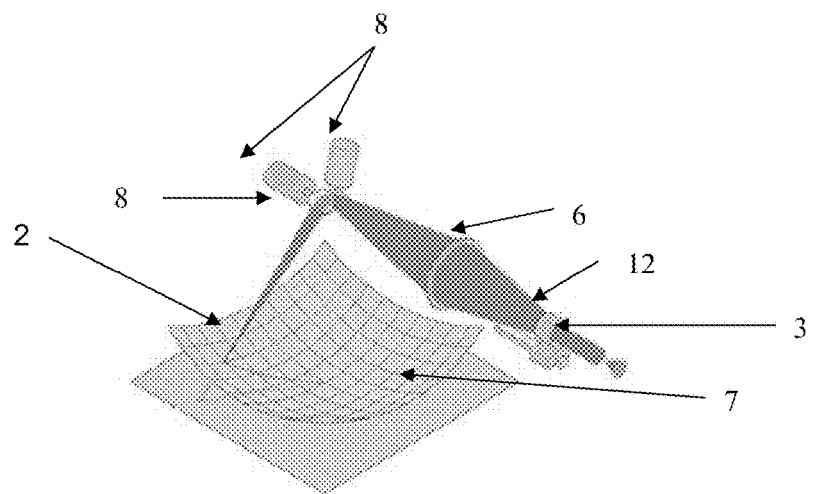
FIG. 3a is a schematic view of an alternative galvanometer having a laser z focus shifter.
Figure 3B:
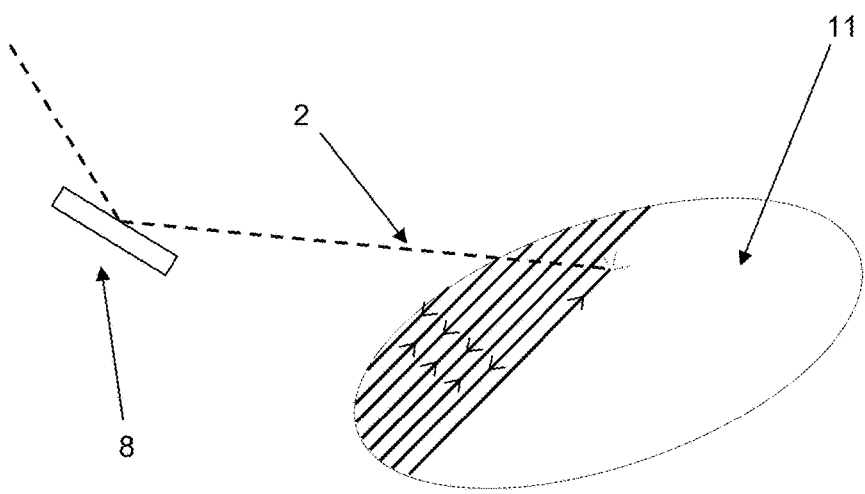
FIG. 3b is a schematic view of a laser beam ablating the surface of a predefined patch of a workpiece.
Figure 3C:
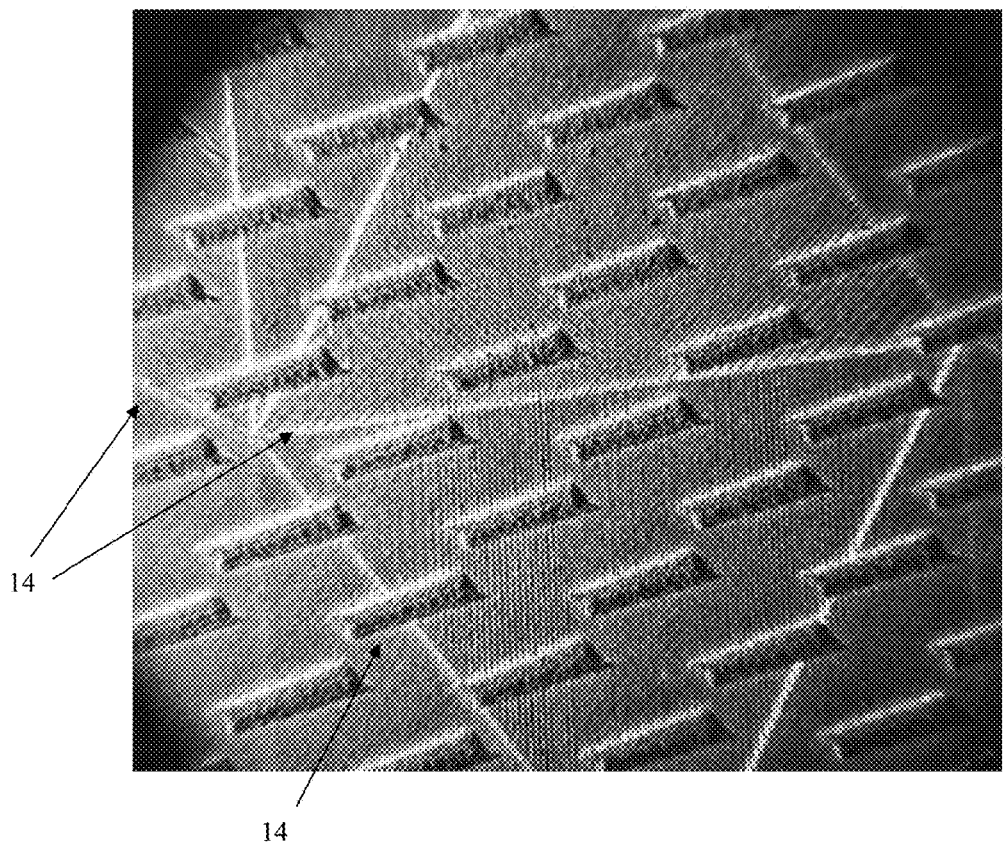
FIG. 3c is a micrograph of a surface ablated in a vector-like manner.
Figure 4:
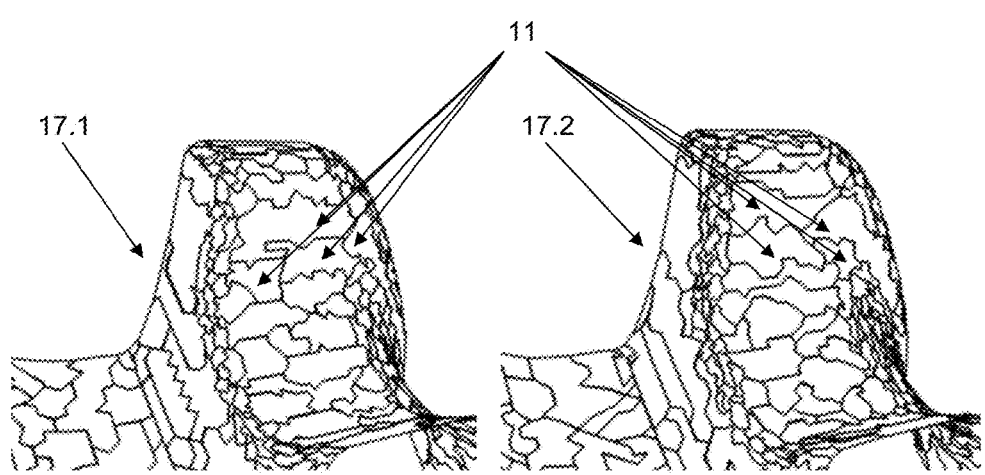
FIG. 4 is a view of patch borders of two consecutive layers at a given location on a solid workpiece.

The application of the inventive laser ablation method offers decisive advantages. If a patch can be defined as such that its delimiting borderline is free of any engraving that is to say not affected by the machining, the above-mentioned disadvantageous boundary lines 14—see for instance again FIG. 3c—will not be generated during the machining of the respective patch. Since that defined specific borderline is not going to be machined during the engraving of the respective patch and remains unaltered in its initial shape, no visible traces of the borders of that patch (compare boundary lines 14 visible in FIG. 3c) will be generated. Consequently, many or even all layers of that patch can be machined successively, without the need to machine in between other patches requiring the repositioning of the machine head.

Although a patch delimited by a borderline according to the invention could be machined in just one run that is to say one coat, it might still be beneficial for quality reasons to subdivide the machining of such a patch into more steps that is to say into few coats.

For example, if with the known laser ablation processes it is necessary to define totally 37 layers ($l_{total}$) on the workpiece surface to be machined, implying 37 repositioning of the laser machine head for each determined patch, with the new and inventive laser ablation method the texturing process can be finalized with the definition of just 4 coats, whereat every coat contains a predefineable amount of layers $l_m$ which are consecutively machined. The sum of $l_m$ layers of every defined coat will also result into the totally amount of foreseen layers $l_{total}$ (in the example given: 37 layers). However, although still 37 layers are in total needed to machine the workpiece surface 7, just 4 repositioning movements of the laser head for every patch are needed. Assuming now, that the workpiece surface is composed of totally 6000 patches, the inventive method will just consist of 24'000 (=4 coats'6000 patches) machining head repositioning movements. With a conventional laser ablation process however, the machining head repositioning would consist in totally 222'000 (=37 layers×6000 patches) single movements. By application of the inventive laser ablation method, a massive reduction of machining head movements—about a factor 10—will be possible. Thus, the machining time of a workpiece to be textured will be reduced even up to 4 times compared with conventional ablation methods! The machining efficiency is consequently massively increase by the invention.

The inventive laser ablation method has a further advantage, since it doesn't necessarily need to be applied from the very beginning of an laser texturing—although indicated—but can be applied whenever a new layer will be subdivided into new patches. That's a quite relevant advantage, since the machining of every new layer might offer a new possibility to create further patches according the invention. This fact is illustrated in FIGS. 9 and 10 and will be explained in the following.

Figure 9A:
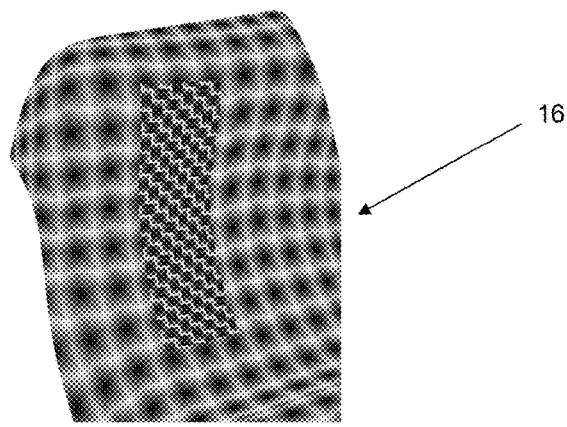
FIG. 9a is a view of a second grey level image defining the texture to be engraved on a workpiece surface.
Figures 10A, 10B, 10C:
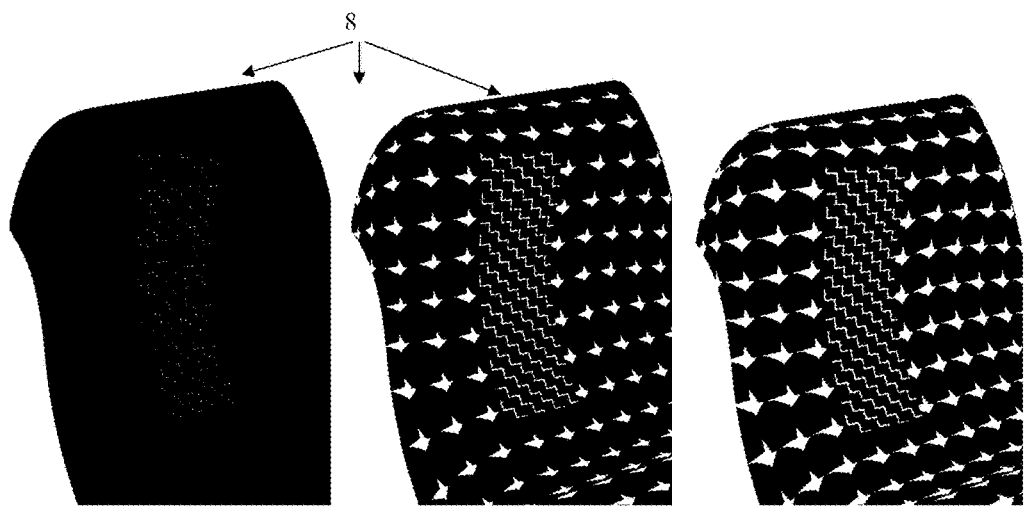

FIG. 9a defines a grey level image 16 as already explained in relation to FIG. 8. That grey level image 16 of FIG. 9a defines consequently the texture to be ablated on the workpiece surface and defines therewith the surface points to be ablated for every single layer which will be defined for machining the workpiece surface. FIGS. 10a to 10d illustrate on the other hand the first 4 defined layers which will be processed for applying the texture of the grey level image 16 according to FIG. 9a. Since every point of a layer can basically just be ablated or not ablated by a laser beam, the grey level image of FIG. 9a is reduced for every defined layer into a black or white information, meaning points/areas of the layer to be ablated are marked black and points/areas which shall not be ablated are marked in white color. FIGS. 10a to 10d correspond to the first 4 layers to be ablated on a workpiece surface 7 and contain consequently just that black or white that means "digital" information. FIG. 10a indicates for instance that every point of that—first—layer needs to be ablated. In the second layer to be machined—corresponding to FIG. 10b—the white areas that is to say points will not be machined/laser ablated. Same applies obviously to FIG. 10c, which represents the third layer to be processed. As visible in those FIGS. 10a, 10b and 10c, it is not possible to define a patch on those layers with a borderline following a path which will not be affected/machined by the laser beam. In fact, the white areas illustrated in FIGS. 10a, 10b and 10c are not connected with each other. Consequently, the definition of patches in these first three layers cannot occur according the invention but will be defined conventionally according to the state of the art (meaning with patches with borders changing from layer to layer and by machining every patch of a layer just once in accordance with the state of the art).

Figure 10D:
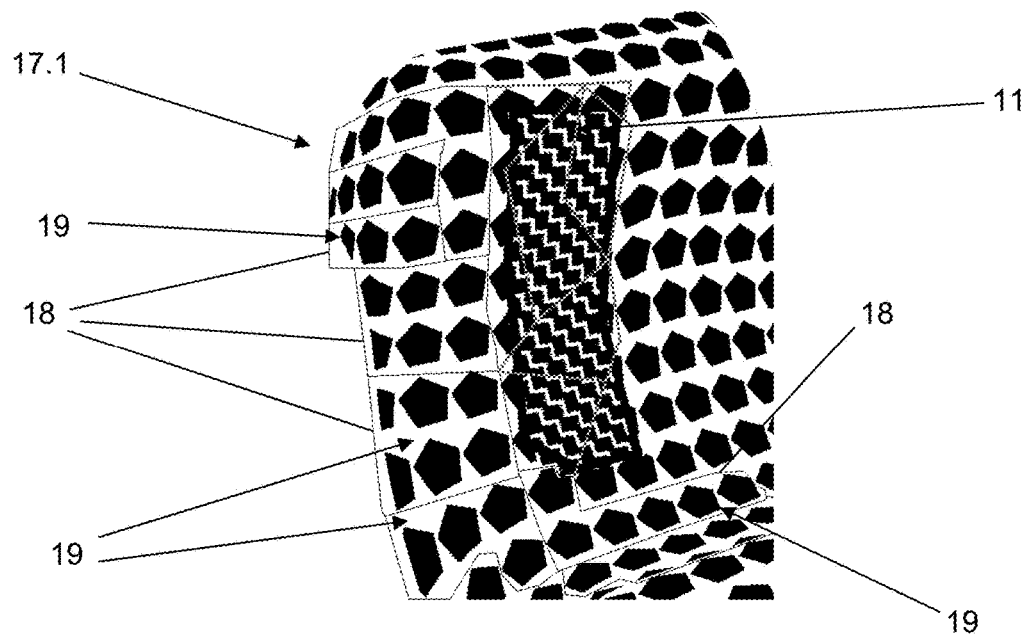

For the fourth layer, illustrated in FIG. 10d, the situation changes however and the inventive method can be applied here for the first time: The displayed layer 17.1 of FIG. 10d allows the formation of borderlines 18 which are determined in such a manner to follow along a path on that layer 17.1 which will not be affected by laser ablation that is to say laser beam engraving of the laser machining head. Those characteristic borderlines 18 of the patches 19 form preferably a closed line around the respective patch 19. Each of the created patches 19 in FIG. 10d with the inventive borderlines 18 can consequently be machined independently from other adjacent patches, since their borders follows a path which will not be affected by any further laser ablation that is to say, machining. The borders of these patches 19 defined by the respective inventive borderlines 18 have the consequent characteristic that no (visible) border trace will be generated during the laser machining of that patch. The determined patches 19 of FIG. 10d can consequently be machined in several subsequently processed layers. This means that the machining of layer 17.1 in one of these patches 19 is immediately followed by the machining of the next layers 17.2, 17.3, 17.4 etc. before the laser head is repositioned to machine another patch 11 or patch 19. The surface area of a workpiece defined by a patch 19 delimited by a borderline 18 according to the invention can be machined by laser ablation till the texture in that area is completely applied and this notably without worrying about occurring border traces. It is self-explanatory that these finally textured areas will not be further machined, while other patches or areas might still be subjection to laser texturing. As mentioned further above, it is possible and sometimes also indicated to subdivide the entire laser ablation machining of a patch 19 into few coats meaning passages, instead of finishing a patch 19 into one run. By that, the surface texturing is more evenly applied on the workpiece surface. E.g. the occurring heat of the laser ablated surface areas is more evenly distributed.

Noteworthy, the invention is also intended to be combined with the conventional, know laser ablation process. In fact, rarely it will be possible to partition at an initial stage the entire surface of a layer just into inventive patches 19 with the characteristic borderlines 18. In the outmost cases, the determination of inventive patches 19 with the characterizing borderline 18 will be combined with the creation of conventional patches 11, having borderlines which are affected partially or entirely to the laser ablation/laser engraving process. This kind of combination is also displayed in FIG. 10d. The layer 17.1 contains also an area which has to be subdivided in conventional patches 11 for applying the laser texturing in conventional manner (meaning ablation layer wise with patch borders changing layer by layer) on that area.

Figure 10E:
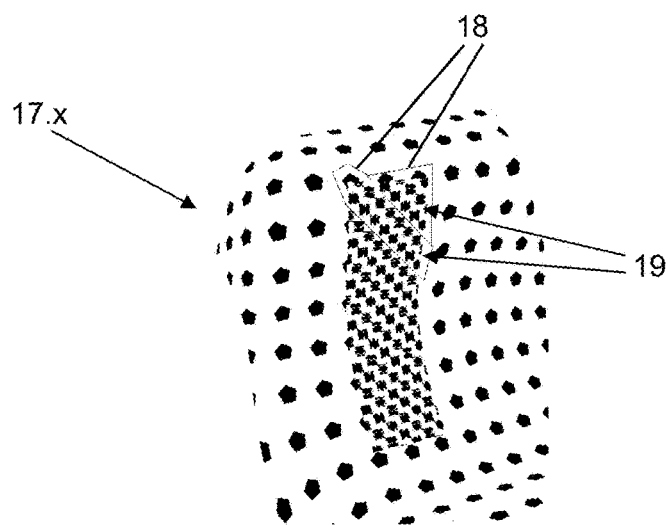
FIG. 10e is a view of a layer at a certain stage of the entire laser texturing process where the entire workpiece surface can be partitioned into inventive patches.

As shown in the following FIG. 10e, at a certain stage of the entire laser texturing process—exemplified here as being the layer 17.x to be worked—the entire workpiece surface can be partitioned into inventive patches 19 (also the forgoing area which had to be subdivided into conventional patches 11 and laser ablated in the conventional manner).

The inventive laser ablation method is intended for the engraving of a surface of a two or three dimensional workpiece with a texture by using a laser beam of a laser machining head. The surface engraving is conducted in one or more layers which are machined consecutively, wherein each defined layer to be machined is subdivided into one or more patches which are intended be machined one after another with the laser beam. The inventions is characterized in that the borderline of at least one patch is determined in such a manner to follow along a path on the layer to be machined which will not be affected by the laser beam engraving that is to say ablation of the laser machining head. Preferably, the borderline of that patch forms a closed line.

The inventive laser ablation method engraves that is to say machines on each determined patch, having a borderline following along a path on the layer which will not be affected by the laser beam, consecutively two or more layers on the workpiece surface, before the laser machining head is repositioned to machine a next patch.

Once every patch of a layer has been machined, the following layer to be machined is again subdivided into new patches. The borderlines of the new patches are determined in such a manner to follow possibly along a path on that following layer which will not be affected by the laser beam engraving. The inventive laser ablation method is consequently applied also on that following layer.

Whenever a surface engraving is conducted in two or more layers and a new layer has to be subdivided into patches, the inventive laser ablation method is applied.

Once a patch is determined having a borderline following a path which will not be affected by the laser beam engraving that is to say laser ablation texturing, a predefined amount $l_m$ of layers are consecutively machined by laser ablation (on the corresponding workpiece surface delimited by that patch). Preferably that predefined amount of layers $l_m$ is lower than the total predetermined amount of layers $l_{total}$ foreseen for the laser engraving of the texture on the surface of the workpiece.

Preferably, the texture to be engraved on the surface of the workpiece is determined by a grey level image, wherein every grey level in that image corresponds to a certain depth that is to say layer to be ablated into the workpiece surface.

The invention includes also an inventive software which uses the inventive laser ablation method for engraving workpiece surfaces with a texture by laser ablation.

The invention includes also a machine tool for laser ablation with a laser machining head applying a laser ablation method according to the proceeding description.

The invention includes also a machine tool for laser ablation with a laser machining head and equipped with a software using the inventive laser ablation method according to the proceeding description.

The present invention is not restricted to the explained embodiment and alternatives.

REFERENCES 1 laser head that is to say laser machining head
2 laser beam
3 laser source
4 X-axis mirror
5 Y-axis mirror
6 F-theta lens
7 Workpiece surface
8 actors, galvanometer drives
9 mesh file of a solid three dimensional workpiece
10 plane surface
11 patch, plot
12 laser Z focus shifter
13 galvanometer
14 boundary lines
15 surface of a two or three dimensional workpiece
16 grey level image defining the texture to be engraved
17.1, 17.2 subsequent layers of the workpiece surface to be machined
18 borderline of a patch following a path which will not be affected by laser ablation that is to say by laser beam engraving
19 patch with a borderline 18 following a path which will not be affected by laser ablation

What is claimed is:

1. A laser ablation method for the engraving of a surface (7) of a two or three dimensional workpiece with a texture (16) by the laser beam (2) of a laser machining head (1), wherein the surface engraving is conducted in one or more layers (17.1, 17.2) which are machined consecutively, the method comprising:
   subdividing at least one of the one or more layers (17.1, 17.2) to be machined into two or more patches (11) intended be machined one after another with the laser beam (2), the subdividing comprising determining a borderline (18) of at least one patch (19) of the two or more patches in such a manner that the at least one patch of the two or more patches comprises a first portion to be engraved and a second portion not to be engraved, the borderline being only along the second portion so as to follow along a path on that layer (17.1, 17.2, 17.x) which will not be affected by the laser beam (2) engraving of the laser machining head (1); and
   laser machining the one or more layers in accordance with the associated two or more patches, wherein:
     the borderline of at least one patch of at least one layer of the one or more layers crosses over the borderline of at least one patch of another at least one layer of the one or more layers viewed from above.

2. The laser ablation method according to claim 1 wherein:
   the borderline (18) of the patch (19) forms a closed line.

3. The laser ablation method according to claim 1, wherein:
   the laser machining head (1) engraves in each determined patch (19) having a borderline (18) following along a path on that layer (17.1, 17.2, 17.x) which will not be affected by the laser beam (2) consecutively two or more layers of the one or more layers (17.1, 17.2, 17.x) on the workpiece surface (7) before the laser machining head (1) is repositioned to machine another patch (11, 19).

4. The laser ablation method according to claim 1, wherein:
   once every patch (11) of a layer (17.1) has been machined, the following layer (17.2, 17.x) to be machined is again subdivided into new patches (11, 19), wherein the borderlines (18) of the new patches (19) are determined in such a manner to follow if possible along a path on that following layer (17.2, 17.x) which will not be affected by the laser beam (2) engraving of the laser machining head (1) on that following layer (17.2, 17.x).

5. The laser ablation method according to claim 1, wherein:
   a determined patch (19), having a borderline (18) which will not be affected by the laser beam (2) engraving, is machined such that a predefined amount $l_m$ of layers (17.1, 17.2, 17.x) are consecutively machined by laser ablation on the workpiece surface (7) delimited by that patch (19).

6. The laser ablation method according to claim 5, wherein:

the predefined amount of layers $l_m$ is lower than a total predetermined amount of layers $l_{total}$ foreseen for the laser engraving of the texture on the surface (7) of the workpiece.

7. The laser ablation method according to claim 1, wherein:
the texture to be engraved on the surface of the workpiece is determined by a grey level image (16), wherein every grey level in that image (16) corresponds to a certain depth to be ablated into the workpiece surface (7).

8. The laser ablation method according to claim 7, wherein:
every said grey level corresponds to a defined layer (17.1, 17.2, 17.x).

9. The laser ablation method according to claim 2 wherein:
the workpiece is a three dimensional workpiece.

10. A laser ablation method for the engraving of a surface (7) of a two or three dimensional workpiece with a texture (16) by the laser beam (2) of a laser machining head (1), whereat the surface engraving is conducted in two or more layers (17.1, 17.2, 17.x), wherein:
each time a new layer is to be subdivided into patches (11, 19) the laser ablation method of claim 1 is applied.

11. The laser ablation method according to claim 10, wherein:
a determined patch (19), having a borderline (18) which will not be affected by the laser beam (2) engraving, is machined such that a predefined amount $l_m$ of layers (17.1, 17.2, 17.x) are consecutively machined by laser ablation on the workpiece surface (7) delimited by that patch (19).

12. The laser ablation method according to claim 11, wherein:
the predefined amount of layers $l_m$ is lower than a total predetermined amount of layers $l_{total}$ foreseen for the laser engraving of the texture on the surface (7) of the workpiece.

13. The laser ablation method according to claim 11, wherein:
the texture to be engraved on the surface of the workpiece is determined by a grey level image (16), wherein every grey level in that image (16) corresponds to a certain depth to be ablated into the workpiece surface (7).

14. The laser ablation method according to claim 13, wherein:
every grey level corresponds to a defined layer (17.1, 17.2, 17.x).

15. A laser ablation method for the engraving of a surface (7) of a two or three dimensional workpiece with a texture (16) by the laser beam (2) of a laser machining head (1), wherein the surface engraving is conducted in one or more layers (17.1, 17.2) which are machined consecutively, the method comprising:
subdividing at least one of the one or more layers (17.1, 17.2) to be machined into two or more patches (11) intended be machined one after another with the laser beam (2), the subdividing comprising determining a borderline (18) of at least one patch (19) of the two or more patches in such a manner to comprise a first portion to be engraved and a second portion not to be engraved, the borderline being only along the second portion so as to follow along a path on that layer (17.1, 17.2, 17.x) which will not be affected by the laser beam (2) engraving of the laser machining head (1); and
laser machining the one or more layers in accordance with the associated two or more patches, wherein the borderline of at least one patch of at least one layer of the one or more layers crosses over the borderline of at least one patch of another at least one layer of the one or more layers viewed from above.

* * * * *